May 1, 1956 G. POLLAK 2,743,847
DISPENSING APPARATUS
Filed June 7, 1952 2 Sheets-Sheet 1

Inventor
Geza Pollak
By Alan Ausbey
Attorney

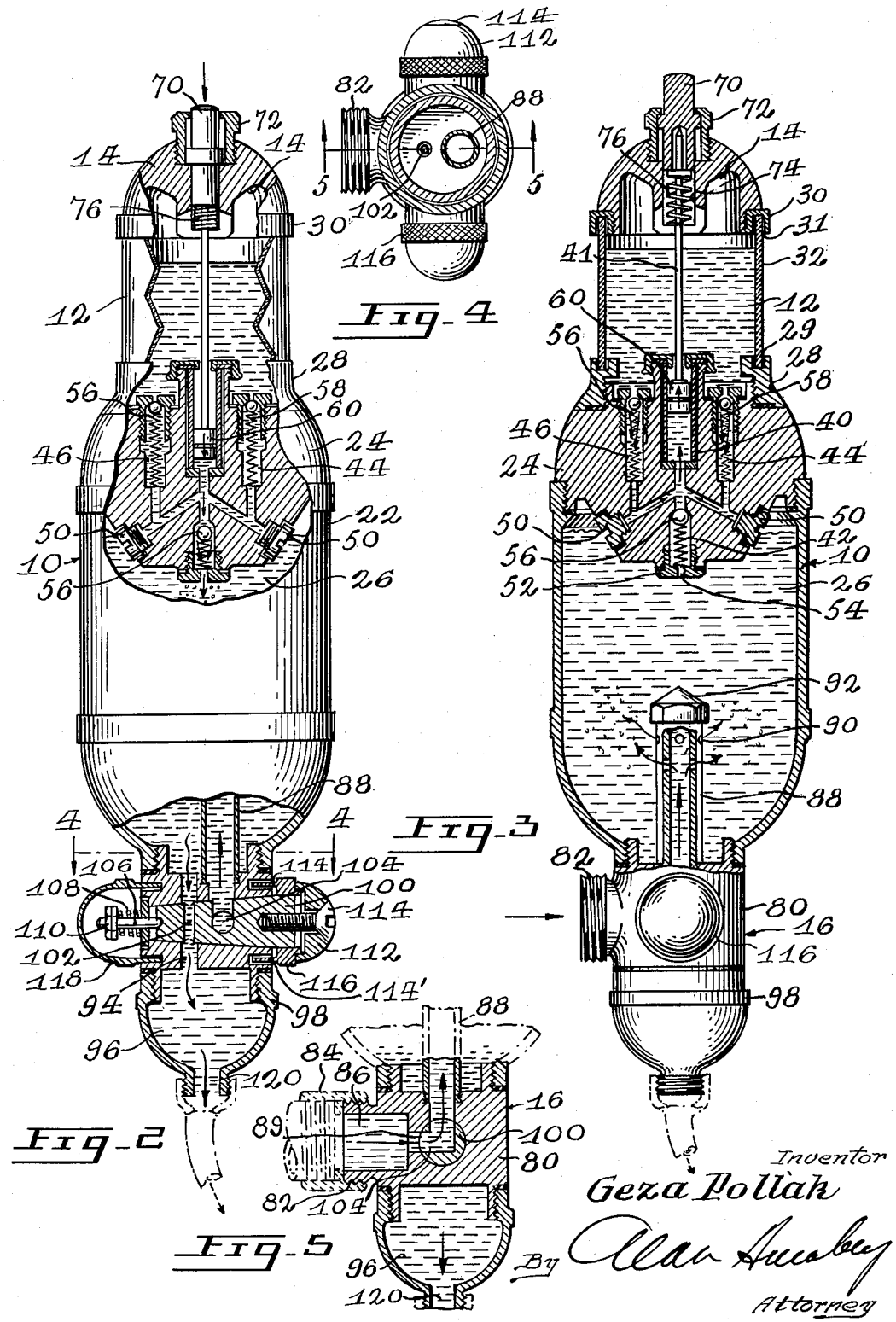

United States Patent Office 2,743,847
Patented May 1, 1956

2,743,847

DISPENSING APPARATUS

Geza Pollak, Montreal, Quebec, Canada

Application June 7, 1952, Serial No. 292,244

5 Claims. (Cl. 222—133)

The present invention relates to liquid mixing and dispensing devices and more particularly to an apparatus of this nature designed for the mixing and dispensing of antiseptic solutions.

At the present time, there are a great deal of antiseptic solutions employed for oral hygiene. Many types of gargles, mouth washes and tooth cleansing fluid solutions are in common household use. Generally, these solutions are taken direct from the container in which they are bought and mixed with water, in a glass or other suitable container, and are then used in the manner prescribed.

The present invention aims to provide a liquid antiseptic dispensing device which, when connected with the usual water supply, is adapted to intimately mix and dispense metered quantities of a liquid antiseptic solution with the water. The present apparatus is designed particularly for household use and embodies means whereby the mixed antiseptic solution is dispensed in a manner particularly suited for oral hygiene.

Accordingly, the invention is a mixing and dispensing apparatus particularly suited for the mixing and dispensing of a liquid antiseptic with quantities of water. Essentially, the device consists of a cylindrical container that is adapted to be secured to a water outlet and which contains a main mixing and water storage chamber, a liquid chemical storage chamber mounted above the mixing chamber, means for dispensing and mixing a measured quantity of liquid chemical solution with the water in the main chamber and control means controlling the entry of water and discharge of a mixture of water and liquid chemical solution respectively.

More specifically, a preferred construction of the device includes a main cylindrical body having a hollow interior forming the main mixing chamber. A hollow cylindrical body, preferably of glass or other transparent material, is mounted on top of the main body to provide a liquid chemical solution storage chamber. A liquid dispensing cylinder is provided between the liquid chemical storage chamber and the main mixing chamber and a piston is slidably mounted in the cylinder so as to be adapted to deliver metered quantities of the chemical solution into water stored in the main mixing chamber. The piston is provided with an elongated piston rod which extends through the upper liquid chemical storage chamber to a connection with a resiliently biased plunger mounted on an exterior top portion of the apparatus mounted over the chemical storage chamber. Suitable liquid passages are provided between the liquid chemical storage chamber and the lower main mixing chamber so that, upon depression of the outside plunger, the piston is adapted to force a metered quantity of the chemical solution stored in the upper chamber down into the lower main chamber. The arrangement of the passages between the upper and lower chambers is such that the upstroke of the plunger, which takes place through the reaction of a coil spring, causes suction in the cylinder, drawing a liquid solution into the main liquid passage where it is subsequently discharged on the downstroke of the piston.

The apparatus is supported in operable position by connection to the usual water supply outlet, preferably by inter-connection of a coupling surrounding an inlet passage adjacent the lower end of the main body of the device and a corresponding coupling half provided on a usual water supply conduit.

In one preferred construction of the apparatus, a cylindrical body having a hemispherically shaped lower end and being of considerably lesser dimensions than the main cylindrical body, is secured to the lower portion of the main cylindrical body to serve as a main supporting member and a housing for a control valve. The main supporting member is provided with an internal water distributing member that is mounted concentrically of the body and extends from the body well within the interior of the mixing chamber. Inlet passages for water are provided in the lower supporting member which extend through the body of the member from the main inlet passage up to the top of the central extension. The top portion of the central extension includes a number of spaced apart openings leading into the water inlet passage, so that when water under pressure is delivered through the central extension, it is forced outwards through the spaced apart openings, causing a turbulence of the water stored in the main mixing chamber to insure a thorough mixing of the metered amount of chemical solution delivered from the upper liquid storage chamber.

The lower portion of the supporting member is provided with a discharge outlet which is in direct connection with the lower portion of the main mixing chamber. A manual valve control means is provided which, upon rotation, is adapted to simultaneously open the water inlet passage into the mixing chamber, and the outlet passage through which the mixture of water and chemical solution passes to the lower portion of the supporting member. A flexible conduit, preferable of plastic tubing, is connected to this lower discharge outlet with the other end of the flexible tubing connected to a manually controllable dispensing device.

It is also contemplated that the lower main supporting member may be dispensed with and suitable inlet and outlet passages provided directly in the main cylindrical body of the device. In an arrangement of this nature the valve control means would also be housed within the lower portion of the main body. It is also contemplated that suitable means might be provided for the heating of the water within the main body, for example, an outside shell might be applied to the main body and a connection made with a suitable source of heated water or, electrical heating means might be applied.

In one preferred form of the apparatus, the dispensing device includes a handle terminating in a removable thin elongated nozzle which can be inserted in the mouth so as to spray the antiseptic solution about the teeth and throat. In an alternative construction the elongated nozzle is replaced by a tooth brush having a hollow interior so that the antiseptic solution mixture is sprayed through on to the bristles when the brush is being used.

As will be appreciated, the mixture of antiseptic and water is dispensed at a pressure corresponding to the inlet pressure of the water source. Due to the particular construction of the manual control member, when the discharge outlet passage is open from the main mixing chamber, the inlet passage from the water supply is also opened giving the liquid escaping from the discharge outlet substantially the same pressure force as that of the incoming water supply. Due to the particular construction of the lower portion of the mixing chamber, and dispensing outlet, and also the manual dispensing member which restricts and accelerates the flow of liquid, the solution when finally dispensed emerges at sufficient pressure to thoroughly clean the mouth and teeth.

Having thus generally described the nature of the invention, particular reference will be made to the accompanying drawings, showing by way of illustration a preferred embodiment of the invention, and in which:

Figure 2 is a front view of the main body of the device with portions of the container interior being shown in section to illustrate the construction in more detail.

Figure 3 is a view corresponding in location to Figure 2 with the entire upper portion of the device being shown in vertical section to show the construction in more detail.

Figure 4 is a sectional view of the construction shown in Figure 2 along the line 4—4 to show the lower supporting and connecting member in more detail and in plan.

Figure 5 is a sectional view of the construction shown in Figure 4 along the line 5—5 to illustrate the relative position of the control member and inlet and outlet passages.

Figure 1:
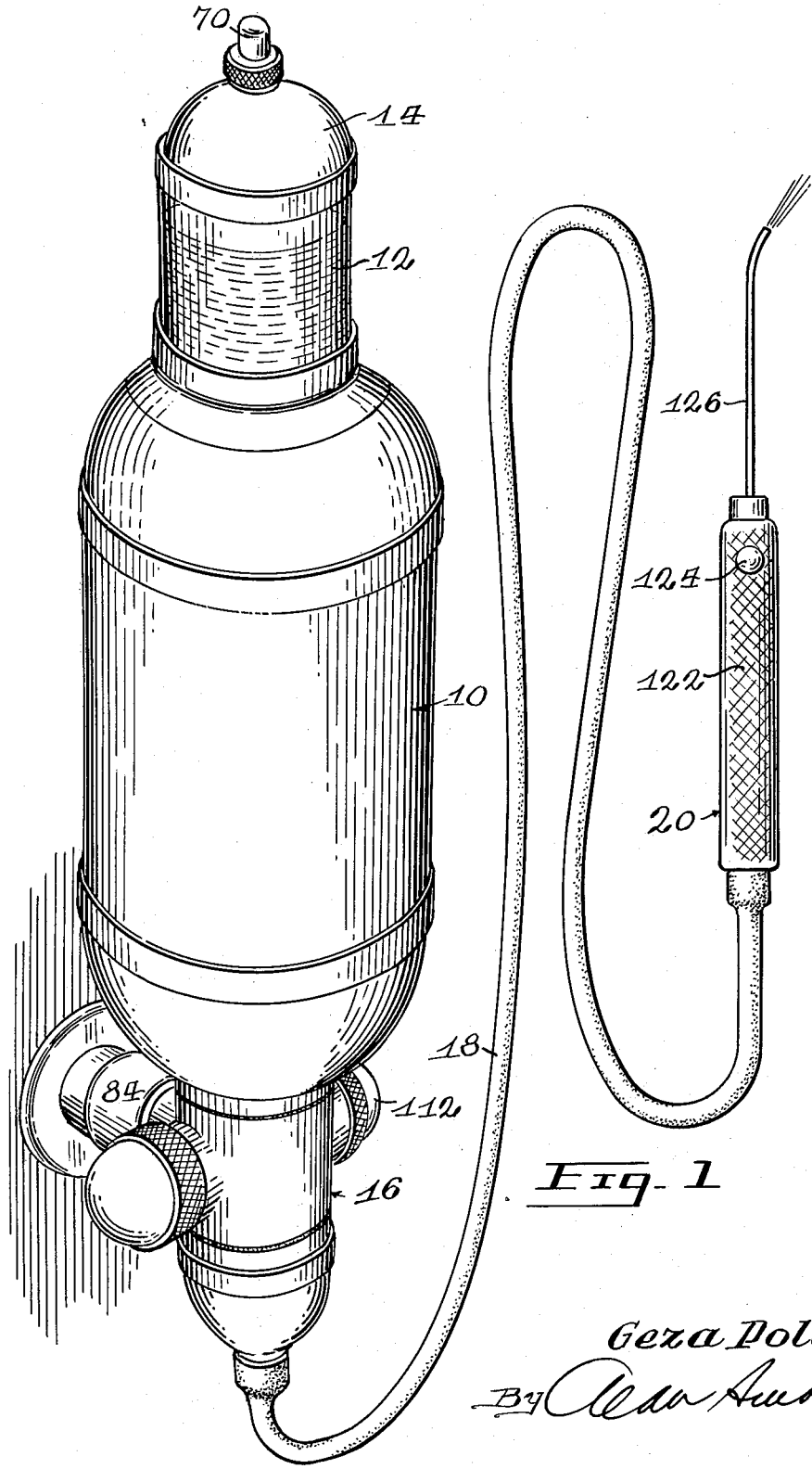
Figure 1 is a diagrammatic view in perspective of a complete dispensing and mixing device with one preferred manual dispensing member shown in full lines.

With particular reference to Figures 1, 2 and 3 of the drawings the main elements of a mixing and dispensing apparatus in accordance with the invention consists of a cylindrical body 10, a transparent top portion 12 provided with a hemispherical cap 14, a means of supporting and connecting the apparatus with the usual water supply, in this case a lower supporting and connecting member 80, and an elongated flexible dispensing tube 18, which forms a connection between the main body of the device and a manual dispensing member 20.

The main body 10 of the device consists of two (2) threadably united portions 22, 24. The interior of the lower portion 22 is hollow and comprises a main mixing and water storage chamber 26. The upper portion 24 is a solid casting which is threadably engaged with the portion 22 so as to provide a closure for the chamber 26 and a support for the upper transparent chamber 12. The chamber 12 is constituted by a pair of annular sleeve members 28 and 30 with a cylindrical transparent tubular section 32 fitted between the sleeve members. Preferably, the tubular element 32 is composed of heavy glass and is secured to the sleeve members 28, 30 by insertion in annular grooves 31, 29, the sealing being completed by means of a suitable waterproof cement. The sleeve member 28 is threadably engaged with the upper portion of the member 24 and the hemispherical cap portion 14 is threadably engaged with the upper sealing ring 30.

The interior of the member 24 is bored centrally to accommodate a cylindrical insert cylinder 40. An opening is provided from the central boring to provide a liquid passage 42 leading into the main mixing chamber 26. Further openings 44, 46 are provided in the member 24 to constitute outlet passages from the upper liquid chemical storage chamber 12 and the member 24 is also bored transversely and in a diagonal direction relative to the passage 42 to connect the passages 46, 44 with the passage 42. The portions of the passages 44, 46 leading into the mixing chamber 26 are counter-bored and tapped and are plugged by suitable threaded plugs 50 so as to prevent liquid chemical solution from the passages 46, 44 leaking into the mixing chamber 26.

The lower portion of the passage 42 is also counter-bored and a plug 52 inserted which includes a central opening 54 to allow liquid chemical solution to pass into the mixing chamber 26 and also to serve as a support for spring-biased ball 56 which acts as a one way check valve. The upper ends of the passages 46, 44 are also counter-bored and tapped and similar one way check valve arrangements 56, 58 are inserted so as to allow quantities of liquid chemical solution to be withdrawn from the upper chamber 12 and to prevent such liquid being forced back into chamber 12 when the device is in operation.

A piston 60 is slidably mounted in the insert cylinder 40 and is provided with an elongated piston rod 41 which extends through the center of the chamber 12 to a connection with a plunger 70 slidably mounted in an insert 72 threadably engaged with the top cap portion 14. The interior of the cap portion 14 is recessed centrally to provide a spring receiving chamber 74 and coil spring 76 is mounted within this chamber so as to resiliently act against the depression of the plunger 70.

With this arrangement, depression of the plunger 70 forces the piston 60 down into the cylinder 40 so as to eject a metered amount of the liquid antiseptic solution from the chamber 12 through the passage 42 into the mixing chamber 26. On the upstroke of the piston as actuated by the coil spring 76 the check valve 56 blocks the passage 42 so that additional liquid solution is withdrawn from the chamber 12 through the passages 46, 44 filling the cylinder 40 in position for the next dispensing stroke.

The main mixing chamber 26 is provided with water under pressure from the supply source to which the device is connected by means of the following arrangement:

In the preferred construction shown, a supporting and connecting member 80, preferably a metal casting, is threadably engaged with the lower portion 22 of the main container body 10. The supporting member 80 includes a main inlet 82 which is suitably threaded for connection to a water outlet by means of a suitable union 84 shown in section in Figure 5. The interior of the member 80 is bored to provide a main inlet passage 86 which extends upwards at right angles through the member so as to lead into an extension member 88 centrally mounted in the interior of the member 80. The extension member 88 includes a corresponding opening 89 therethrough which forms a continuation of the passage 86. The upper end of the member 88 is provided with a plurality of spaced apart openings 90 leading into the opening 89 so as to dispose the water flowing through the passage 86 about the lower portion of the chamber 26 in a turbulent manner. The upper end of the member 88 is provided with an end closure cap 92 so that as the water under pressure encounters this cap, it flows through the openings 90 causing a turbulence of the water stored within the mixing chamber 26 so as to intimately mix the liquid solution introduced from the chamber 12 with the water.

A second opening is provided in the member 80 so as to extend directly through the member and provide an outlet passage 94 leading into an enlargement 96 formed by the connection of a separate hemispherical member 98 to the lower threaded portion of the member 30.

In order to control the flow of water through the member 80 and into the chamber 26, and from the chamber 26, there is provided a tapered valve member 100 which slidably fits in a corresponding tapered recess extending into the body of the member 80. The valve member 100 is provided with a first opening 102 which is adapted to register with the passage 94 and a second opening 104 which is adapted to register with the passage 86. An extension 106 of the valve member 100 leads to the exterior of the member 80 and a coil spring 108 is fitted over the extension 106 where it is retained in position by a suitable locking nut 110. With this arrangement, and due to the tapered shape of the valve member 100, this controlling element is resiliently held in position within the member 80 so as to bring the openings 102, 104 into alignment with the corresponding passages which they control.

A suitable control knob 112 is provided on the exterior of the member 80 and is secured to the valve element 100 by a screw 114. The control knob 112 includes inwardly extending flanges 114', which fit within a corresponding annular recess provided in the member 80. The outer periphery of the control knob 110 is knurled or serrated as indicated at 116 to provide a better grip for manual rotation and a suitable stop is provided so that the rotary movement of the valve element 100 is restricted to a quarter turn. This is sufficient to turn the openings 102, 104 transversely to the passages 94, 86 so as to cut off the inflow of water and outflow of mixed water and antiseptic solution. By the counterrotation of the knob 110 through a quarter rotation, the openings 102, 104 are again in alignment with their corresponding passages placing the device in order for dispensing operation. A cover member 118 corresponding in external dimensions to the control knob 112 is mounted on the opposite side of the member 80 to enclose the valve extension 106 and to give the member 80 a symmetrical appearance.

The lower portion of the member 98 is provided with an outlet passage 120, the exterior of the member 98 at this point being threaded to provide a means of connecting the elongated dispensing tube 18. At the other end of the dispensing tube 18 the manual dispensing member 20 is connected in a similar manner.

While it is not illustrated, it is also contemplated that the lower supporting member 80 might be dispensed with and the controlling valve arrangement moved into the main body of the device within the mixing chamber 26. In this arrangement, suitable inlet and outlet openings would be provided in the main body and an external controlling knob similar to the one shown in the preferred construction would also be provided as extending from the side of the main body. It is also contemplated that suitable means might be provided for the heating of the water and/or mixture of water and chemical solution in the chamber 26. For example, the main body could be of a double wall construction and warm water circulated about the main body, or alternatively an electrical heating element could be employed. The reason for raising the temperature of the water within the main body is to bring it to a suitable temperature when the water from the usual outlet is cold.

The dispensing member 20 shown consists essentially of a handle portion 122 having a valve arrangement therein controlled by a push button 124. An elongated dispensing nozzle 126 is inserted in the handle 122 by means of a bayonet catch arrangement (not illustrated) of a well known type so that, if desired, the nozzle 126 may be substituted by a tooth brush attachment 128. The tooth brush attachment 128 is of conventional design with the exception that the bristle supporting portion 129 is hollow and includes holes adjacent the bristles 130 so that, as the mixture of water and antiseptic solution is supplied to the member 20 through the hose 18, it passes through the tooth brush 128 under the control of the push button 124.

This portion of the device is conventional to other arrangements of this nature and is shown merely by way of illustration as an example of suitable attachments which can be used in combination with the dispensing and mixing apparatus of the invention.

As will be understood, by reference to the preceding description and accompanying drawings a liquid chemical mixing and dispensing device of the type described is capable of intimately mixing any desired metered quantity of a liquid antiseptic solution useful in oral hygiene with water supplied directly from the usual source, and, by the pressure of the water supplied, can be forcibly dispensed in a manner calculated to give the maximum cleaning action.

I claim:

1. A dispensing apparatus comprising in combination a main valve block of annular configuration, a first cylindrical enclosure member mounted on one end of said block in axial alignment therewith, a second cylindrical enclosure member mounted on the other end of said block in axial alignment therewith, a first cap on the end of said first enclosure member remote from said block, cap means mounted on said second enclosure member remote from said block; the block, enclosure members, cap and cap means being of overall cylindrical shape and in axial alignment thereby forming a continuous stream-lined body; the block forming with the first enclosure member and first cap a first liquid chamber, the block forming with the second enclosure member and the cap means a second liquid chamber, the block being provided with a passage having an axially aligned portion constituting a pump cylinder leading to the first chamber and another portion constituting a fluid passage leading from the second chamber to the pump chamber, a check valve in said passage, said block also being formed to have a connecting passage leading from said first chamber to said pump chamber, a check valve in said connecting passage adjacent to said first chamber, the first cap enclosing an axial plunger passage, a piston in said cylinder and a piston rod leading from said piston to within said plunger passage, spring means in the plunger passage urging said piston rod to piston- retracted position and a manually operable plunger protruding from said first cap and engageable with said piston rod to force said piston against the spring means in an active stroke, said second cap means being provided with valve means for permitting introduction of fluid into said second chamber and for dispensing fluid therefrom.

2. A dispensing apparatus, according to claim 1, in which the cap means includes a second valve block, and a cap member mounted thereon remote from said second enclosure member, said cap member forming with the second block a third fluid chamber, a dispensing passage extending through said second block from said sleeve to said third chamber, a fluid entry passage extending into said block from the outside, and a valve plug for controlling said fluid entry and dispensing passages, and means for actuating said second valve.

3. A dispensing apparatus, according to claim 1, in which the valve block is of greater diameter at one end than the other, the first cylindrical enclosure member is mounted on the smaller end, and the second cylindrical member mounted on the larger end.

4. A dispensing apparatus, according to claim 1, in which the second enclosure member tapers to a neck at the end remote from the valve block and said cap means is mounted on said neck.

5. A dispensing apparatus, according to claim 2, in which there is mounted on the second valve block a tube leading from said dispensing inlet opening and extending upward into said chamber and an outlet opening in said tube remote from said second valve block.

References Cited in the file of this patent

UNITED STATES PATENTS

| | | |
|---|---|---|
| 1,473,025 | Erickson | Nov. 6, 1923 |
| 1,736,803 | Shields | Nov. 26, 1929 |
| 2,028,042 | Braunstein | Jan. 14, 1936 |
| 2,088,082 | Davis | July 27, 1937 |
| 2,127,731 | Hayes | Aug. 23, 1938 |
| 2,303,667 | Taborski | Dec. 1, 1942 |
| 2,516,195 | Finton | July 25, 1950 |